United States Patent [19]

Sada

[11] Patent Number: 4,738,160
[45] Date of Patent: Apr. 19, 1988

[54] VEHICULAR HYDRO-MECHANICAL TRANSMISSION SYSTEM WITH SPEED RANGE SHIFT

[75] Inventor: Kenzo Sada, Osaka, Japan
[73] Assignee: Kubota Ltd., Osaka, Japan
[21] Appl. No.: 875,103
[22] Filed: Jun. 17, 1986
[30] Foreign Application Priority Data

Jun. 26, 1985 [JP] Japan ............................. 60-98181[U]

[51] Int. Cl.⁴ ..................... F16H 47/04; F16H 47/08
[52] U.S. Cl. .................................... 74/687; 74/677
[58] Field of Search ................................ 74/687, 677

[56] References Cited

U.S. PATENT DOCUMENTS

| | | | |
|---|---|---|---|
| 3,492,891 | 2/1970 | Livezey | 74/687 X |
| 3,884,095 | 5/1975 | Miyao et al. | 74/687 |
| 3,903,755 | 9/1975 | Polak | 74/687 |
| 3,922,931 | 12/1975 | Osujyo et al. | 74/687 X |
| 3,990,327 | 11/1976 | Margolin | 74/687 |
| 4,286,477 | 9/1981 | Meyerle et al. | 74/687 |
| 4,291,592 | 9/1981 | Meyerle et al. | 74/687 |
| 4,313,351 | 2/1982 | Hagin | 74/687 |
| 4,491,034 | 1/1985 | Fredriksen | 74/687 |
| 4,557,160 | 12/1985 | Reynolds | 74/687 |

FOREIGN PATENT DOCUMENTS 0059055  9/1982  European Pat. Off. ............ 74/687

*Primary Examiner*—Dirk Wright
*Attorney, Agent, or Firm*—Birch, Stewart, Kolasch & Birch

[57] ABSTRACT

A hydro-mechanical power transmission for vehicles wherein optional two of the three elements of a planetary gearing serve as an input portion and an output portion, and the other element is driven at a steplessly variable speed by a static hydraulic speed change device which is operable by the input portion or the output portion. A change-over device is provided in a power transmission system for the speed change device to drive the other element in different speed ranges by switching the change-over device. For running on the road, the speed is widely variable from low to high, while for working, the running speed is finely adjustable within one of the speed ranges.

7 Claims, 4 Drawing Sheets

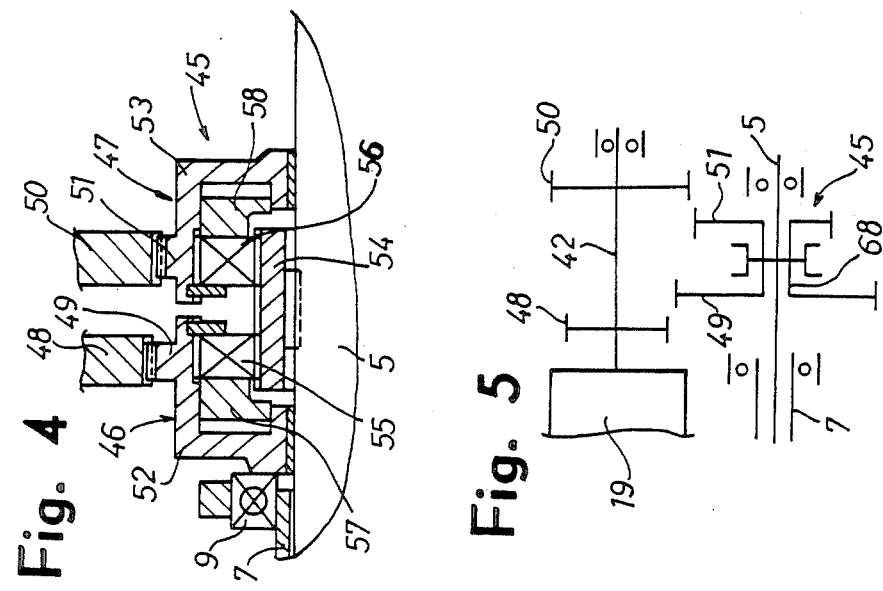
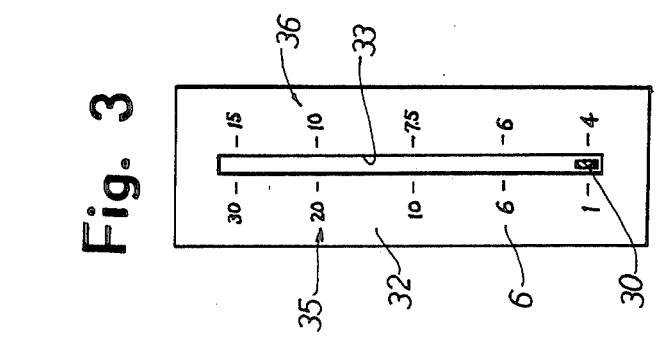
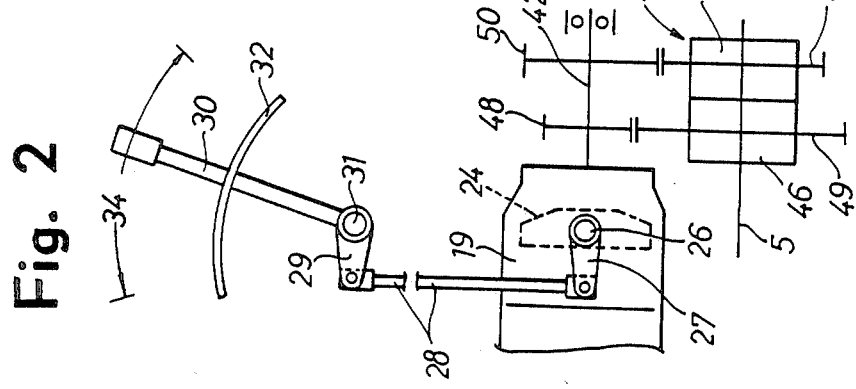

VEHICULAR HYDRO-MECHANICAL TRANSMISSION SYSTEM WITH SPEED RANGE SHIFT

FIELD OF THE INVENTION AND RELATED ART STATEMENT

The present invention relates to hydro-mechanical power transmissions for vehicles.

Power transmissions for vehicles such as tractors include those of the hydro-mechanical type which comprise a planetary gearing and a hydraulic system including a static hydraulic speed change device. With this type of power transmission, the power from an engine is dividedly passed through two channels; a minimum of power is fed to the hydraulic system for the hydraulic speed change device to effect a stepless speed change, while the remaining power is mechanically transmitted through the planetary gearing so as to cause the power to smoothly flow dividedly. Thus, the power trasmission has the function of stepless speed change afforded by the static hydraulic speed change device and exhibits a high efficiency provided by the planetary gearing.

The hydro-mechanical power transmissions of the type described are divided into two types according to the mode of driving the hydraulic pump of the speed change device, i.e., according to which of the three components of the planetary gearing is used for driving the pump. Thus, there are the output-split type wherein the pump is driven by the input component, and the input-split type wherein the pump is driven by the output component.

However, whichever mode of driving is resorted to, the hydraulic pump of the speed change device is usually driven at a constant speed via a single train of gears, so that it has been impossible to alter the speed range as desired although the transmission is adapted for stepless speed change by virtue of the operation of the static hydraulic speed change device.

In the case of tractors, for example, the running speed of the vehicle differs greatly when it is driven on the road and when it is driven in the field or the like for working. It is required that the speed be variable over a wide range of from low to high as desired during running on the road, whereas during working, the speed must be variable finely delicately over a specified range (e.g., low speed range or medium speed range) according to the type of working implement used, field conditions or the like.

With the conventional power transmissions, the running speed is variable steplessly by adjusting the discharge of the hydraulic pump of the hydraulic speed change device with a speed change lever, but it is impossible to change the range of running speeds as desired with a definite shift range held for the change lever, since the number of revolutions of the hydraulic pump is constant at all times unless the number of revolutions of the engine changes.

Accordingly, it has not always been possible to conduct work at a running speed most suited to the working conditions because of difficulties in finely adjusting the running speed in a given range during working.

OBJECTS AND SUMMARY OF THE INVENTION

In view of the problem heretofore encountered, an object of the present invention is to make it possible to change the speed over a wide range of from low to high as desired for running on the road by changing the speed range as required and to finely adjust the running speed within a specified range for working so as to obtain an optimum running speed at all times.

Another object of the present invention is to make it easy to change the speed range and to make it possible to effect speed changes in different speed ranges merely by manipulating a single speed change lever.

Other objects of the present invention will become apparent from the following description with reference to the accompanying drawings.

To fulfill the foregoing objects, the present invention provides a hydro-mechanical power transmission for vehicles which comprises a planetary gearing composed of three elements and in which optional two of the elements serve as an input portion and an output portion, and the other element is driven at a steplessly variable speed by a static hydraulic speed change device operable by the input portion or the output portion, the transmission being characterized in that change-over means is provided in the power transmission system for the speed change device, the change-over means being switchable to drive said other element in different speed ranges.

BRIEF DESCRIPTION OF THE DRAWINGS

The drrawings show preferred embodiments of the present invention.

FIG. 2 is a diagram showing a control system for the speed device;

FIG. 3 is plan view showing a guide plate;

FIG. 4 is a sectional view showing change-over means;

FIG. 5 is a diagram showing change-over means of the selective meshing type;

DESCRIPTION OF THE PREFERRED EMBODIMENTS

Figure 1:
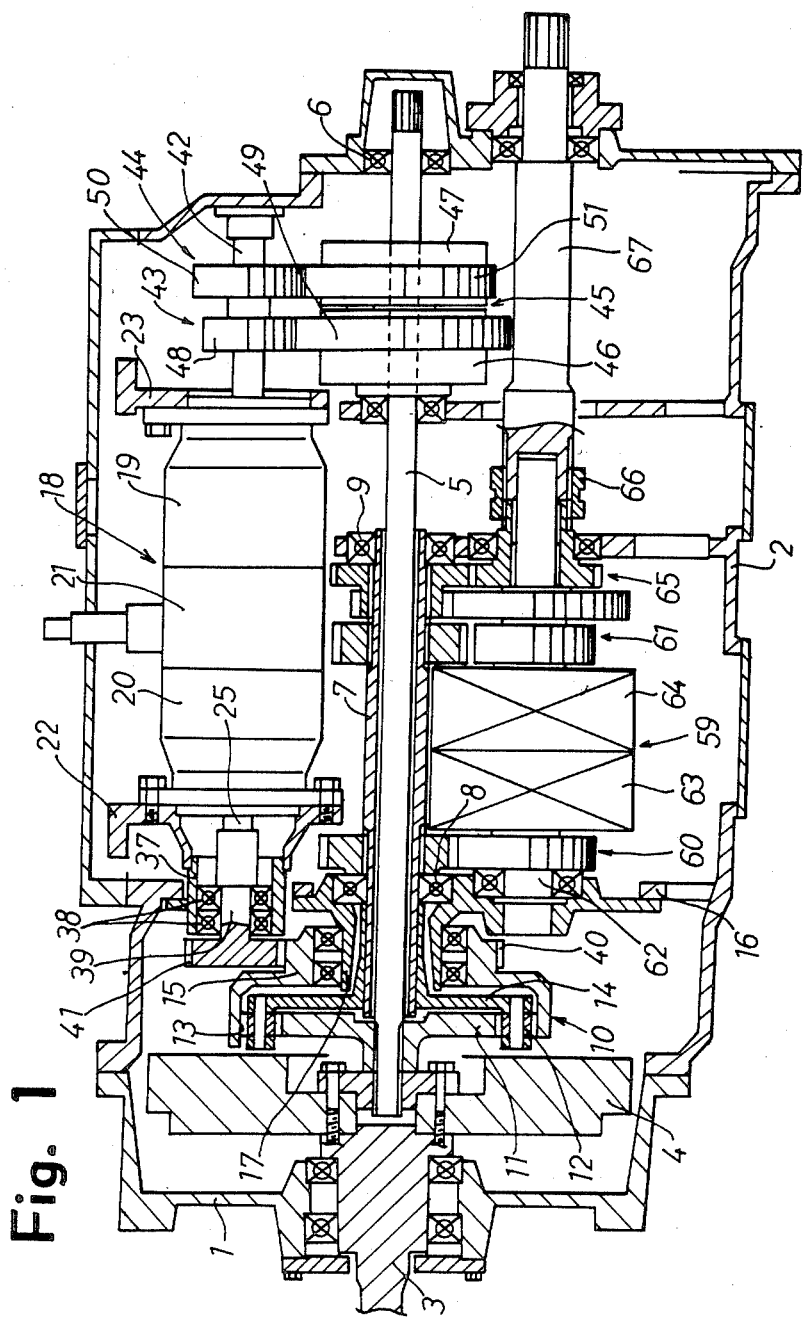
FIG. 1 is a sectional view showing a power transmission comprising a single static hydraulic speed change device.

The present invention will be described below in detail with reference to the preferred embodiments illustrated. FIG. 1 shows a hydro-mechanical power transmission for farm tractors.

With reference to FIG. 1, a flywheel housing 1 and a transmission case 2 are connected to the rear side of the crankcase of an engine. The engine has a crankshaft 3 provided with a flywheel 4. An input shaft 5 has a front end connected to the crankshaft 3 and a rear end supported by a bearing 6 on the transmission case 2. A tubular output shaft 7 has the input shaft 5 inserted therethrough concentrically therewith, with a clearance formed therebetween, and is supported by bearings 8, 9 on the transmission case 2.

A planetary gearing 10 comprises three elements, i.e., a sun gear 11, a planet pinion 12 and a ring gear 13. The sun gear 11 serving as an input portion is connected to the input shaft 5. A carrier 14 supporting the planet pinion 12 and serving as an output portion is coupled to the output shaft 7. The ring gear 13 is integral with a carrier 15, which is rotatably supported by bearings on a sleeve 17 fixed to a partition wall 16 of the transmission case 2.

A static hydraulic speed change device 18 comprises a hydraulic pump 19 and a hydraulic motor 20 which are connected together end-to-end by a center section 21. The device 18 is installed within the case 2 by a pair of front and rear supports 22, 23. As seen in FIG. 2, the hydraulic pump 19 is a variable displacement pump having a swash plate 24. The motor 20 is of the swash plate fixed displacement type. The pump 19 and the motor 20 are hydraulically coupled together so that the speed of the shaft 25 of the motor 20 is steplessly variable by adjusting the angle of the swash plate 24.

As seen in FIG. 2, a pin 26 supporting the swash plate 24 of the pump 19 is operatively connected to a speed change lever 30 by an assembly comprising a link 27, rod 28, link 29, etc. The speed change lever 30 is supported by a pivot 31 on a stationary member. The lever 30 is movable forward and rearward through a guide slit 33 in a guide plate 32 over a shift range 34 and is retainable in a desired position, for example, by frictional contact. As shown in FIG. 3, the guide plate 32 bears on opposite sides of the slit 33 speed scales 35, 36 indicating different speed ranges.

The shaft 25 of the hydraulic motor 20 is connected to a shaft 39 supported by bearings 38 in a bearing case 37. The shaft 39 is operatively connected by a gear 41 to a gear 40 formed on the outer periphery of the carrier 15 for the ring gear 13.

The hydraulic pump 19 has a rearwardly projecting shaft 42, which is operatively connected to the input shaft 5 by two gear trains 43, 44 which are different in gear ratio and by hydraulic clutches 46, 47 which constitute change-over means 45. The gear train 43, which comprises gears 48, 49, drives the pump 19 at a high speed to give a first range of widely varying speeds. The gear train 44 drives the pump 19 at a lower speed than the train 43 to provide a second speed range of low or medium speeds. The train 44 is composed of gears 50, 51.

With reference to FIG. 4, the hydraulic clutches 46, 47 respectivley comprise clutch bodies 52, 53 rotatably supported by the input shaft 5, a clutch boss 54 fixed to the input shaft 5, multiplicities of clutch plates 55, 56 provided between the clutch boss 54 and the clutch bodies 52, 53, and pistons 57, 58 for pressing the plates 55, 56. One of the clutches 46, 47 is selectively operated by unillustrated valve means.

Forward-reverse change-over means 59 comprises a forward gear train 60 and a reverse gear train 61 which are operatively connected to the output shaft 7, and a forward hydraulic clutch 63 and reverse hydraulic clutch 64 for respectively selectively coupling the gear trains 60, 61 to a transmission shaft 62. When the forward clutch 63 is engaged, the shaft 62 rotates in the forward direction, while when the reverse clutch 64 is engaged, the shaft 62 rotates in the reverse direction. The shaft 62 is disposed below the output shaft 7 in parallel therewith and operatively connected to a transmission shaft 67 by a reduction gearing 65 and a shifter clutch 66. The shaft 67 is coupled to rear wheels via unillustrated differential means to drive the rear wheels.

For running, one of the clutches 46, 47 is engaged, whereby a portion of the power from the engine is transmitted from the input shaft 5 via the clutch 46 or 47 and the gear train 43 or 44 to the hydraulic speed change device 18, which controls the rotation of the ring gear 13 of the planetary gearing 10 by its stopless speed change action. Consequently, the gearing 10 effects a stepless speed reduction, whereby the power of the engine can be transmitted to the output shaft 7 efficiently upon stepless speed change.

Stated more specifically, when the speed change lever 30 is shifted forward or rearward for a speed change, the swash plate 24 of the hydraulic pump 19 inclines about the pin 26 through a desired angle. The number of revolutions of the shaft 25 of the motor 20 is therefore variable steplessly to control the rotation of the ring gear 13 via the gears 41, 40 even if the number of revolutions of the pump 19 is constant. For example, if the rotation of the motor 20 is discontinued, the power from the crankshaft 3 is subjected to a speed reduction at the gear ratio of the sun gear 11 and the planet pinion 12, whereupon the power is delivered to the output shaft 7 through the carrier 14. Further if the ring gear 13 is rotated by the motor 20 in the same direction as the direction of rotation of the output, the number of revolutions of the output shaft 7 increases according to the number of revolutions of the gear.

When the vehicle is to be driven in one speed range for running on the road and then in the other speed range for working, the desired speed range is selected suitably by the hydraulic clutch 46 or 47. More specifically, when the clutch 46 is engaged, the pump 19 is driven at a high speed by the power delivered from the input shaft 5 via the gear train 43 to increase the maximum discharge of the pump 19. Accordingly, altering the angle of the swash plate of the pump 19 greatly varies the discharge from 0 to a maximum, further greatly varying the number of revolutions of the motor 20 and consequently greatly varying the number of revolutions of the output shaft 7 which is subjected to speed change by the planetary gearing 10. Thus, the speed is variable over a wide range of from low to high.

When the clutch 47 is engaged, on the other hand, the pump is driven at a low speed by the input shaft 5 via the gear train 44. This decreases the maximum discharge of the pump 19, permitting the motor 20 to rotate only in the range of low to medium speeds. Consequently, the speed change by the planetary gearing 10 is in the range of low to medium speeds.

In this way, the speed range is changeable for running by changing the number of revolutions of the hydraulic pump 19 by the hydraulic clutches 46, 47. When the clutch 46 is engaged, a desired speed can be selected, for example, from the range of 1 to 30 km/h by shifting the speed change lever 30 with reference to the scale 35 at the left side of the guide plate 32. Further when the clutch 47 is engaged, a desired speed can be selected, for example, from the range of 4 to 15 km/h by shifting the speed change lever 30 with reference to the right-side scale 36. Moreover, the shift range 34 for the lever 30 is the same for the two cases, so that the lever 30, if slightly shifted, greatly varies the running speed in the former case, while the speed is finely adjustable in the latter case.

Figure 6:
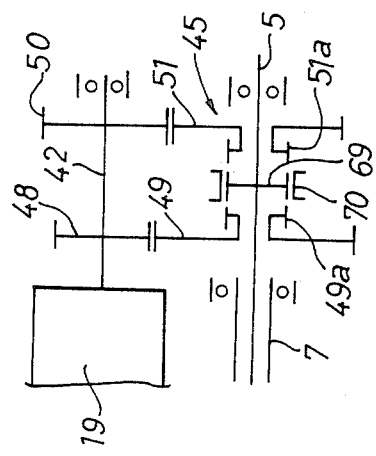
FIG. 6 is a diagram showing change-over means of the constant meshing type.

The change-over means 45, which comprises the hydraulic clutches 46, 47, may alternatively be composed of meshable gears as seen in FIGS. 5 and 6. FIG. 5 shows change-over means 45 of the selective meshing type. A shift gear 58 having gears 49, 51 is mounted on the input shaft 5 and is slidable axially thereof. When the gear 68 is shifted, one of the gears 49, 51 selectively meshes with the corresponding one of gears 48, 50 on the pump shaft 42.

FIG. 6 shows change-over means of the constant meshing type. Gears 49, 51 are idly rotatably mounted on the input shaft 5, and a splined boss 69 is fixedly mounted on the input shaft 5 between the gears 49, 51. A shifter 70 on the splined boss 69 is selectively engageable with one of engaging portions 49a, 51a of the gears 49, 51.

Figure 7:
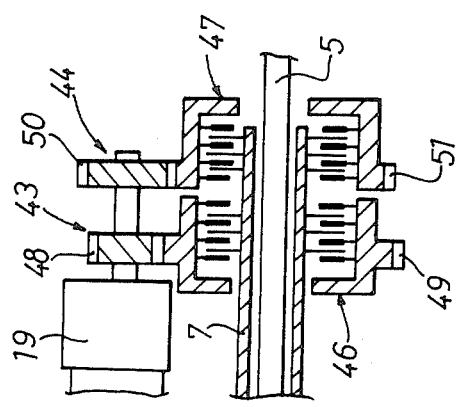
FIG. 7 is a diagram showing an input-split arrangement.

The system for driving the hydraulic pump 19 may be of the output-split type wherein the pump is driven by the input shaft 5. Alternatively, the pump 19 may be driven by the output shaft 7 through an input-split system wherein the clutches 46, 47 are mounted on the shaft 7 as seen in FIG. 7.

Figure 8:
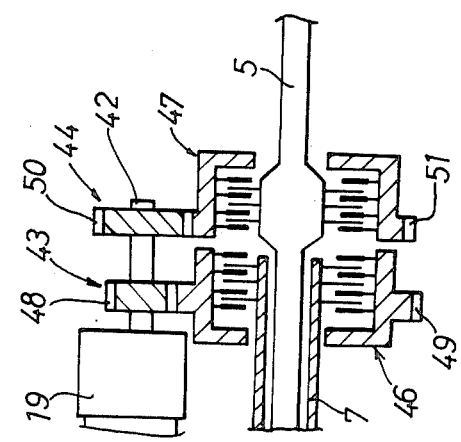
FIG. 8 is a diagram showing an input- and output-split combination arrangement.

Further as shown in FIG. 8, it is possible to mount the clutch 46 on the output shaft 7 and the clutch 47 on the input shaft 5 to provide an input-split and output-split combination system. In this case, output splitting achieves a high transmission efficiency at high speeds, while the input splitting achieves a high transmission efficiency at low speeds, so that it is desirable to use one of the drive means preferentially for the speed range which is more frequently used so as to achieve an increased transmission efficiency.

Figure 9:
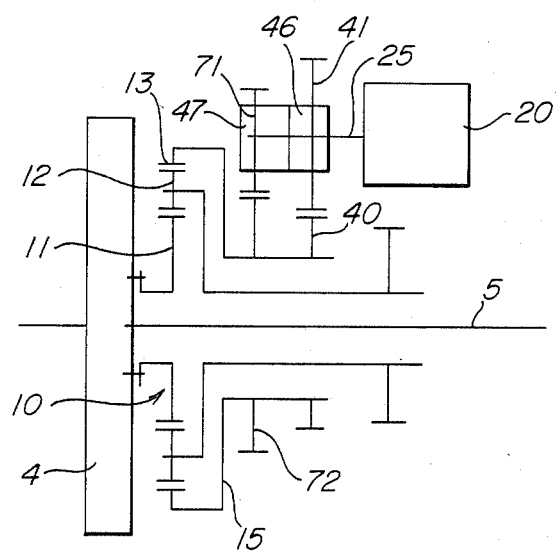
FIG. 9 is a diagram showing an arrangement wherein change-over means is provided at the output side of a hydraulic motor.

The objects of the invention can be achieved insofar as the change-over means 45 is provided in the power transmission system including the hydraulic speed change device 18. Accordingly, the means 45 can be disposed not only at the drive side of the hydraulic pump 19 but also between the motor 20 and the planetary gearing 10 as seen in FIG. 9. More specifically, besides the gears 41, 40, gears 71, 70 different from the former gears in gear ratio are provided between the shaft 25 of the motor 20 and the carrier 15 for the ring gear 13, and the gears 41, 40 or the gears 71, 72 are selected by the hydraulic clutches 46 or 47.

With the embodiments described above, the single static hydraulic speed change device 18 is used, and the number of revolutions of the hydraulic pump 19 thereof is changed by the change-over means.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. A vehicular hydro-mechanical power transmission system comprising:
    an input shaft (5) operatively connected with an engine crank shaft (3) of an engine, said input shaft including a forward and a rearward end;
    a tubular output shaft (7) sheathing the input shaft (5);
    a planetary gear assembly (10), including three elementary gears of a sun gear (11), a planetary gear (12) and a ring gear (13), being operatively disposed so that one elementary gear selected from the three elementary gears is in drive-connection with the input shaft (5) and one selected from the remaining two gears is also in drive-connection to the output shaft (7);
    a capacity-variable hydraulic pump (19) alternately driven by the input shaft (5) or by the output shaft (7) with capacity variation being performed by a single lever means of a speed change lever (30);
    a hydraulic motor (20) operatively connected with the pump (19) hydraulically to drive steplessly the last remaining elementary gear of the assembly (10);
    said hydraulic pump (19) and the motor (20) defining a hydrostatic speed change device (18);
    said vehicular hydro-mechanical power transmission system is characterized in that;
    said planetary gear assembly (10) is disposed at a position adjacent to the forward end of the input shaft (5);
    a plurality of gear trains (43) (44) for driving the hydraulic pump (19) with different speeds by change of gear ratios, and a change-over means (45) to connect the gear trains (43) (44) selectively to the input shaft (5) or the output shaft (7) are disposed at a position spaced rearwardly from the assembly (10);
    said hydrostatic speed change device (18) including the hydraulic pump (19) and the hydraulic motor (20) is arranged, forming a longitudinal series connection with the pump (19) positioned in the rear of the motor (20), so that the hydrostatic device (18) as a whole is juxtaposed to the input and the output shafts (5) (7) almost in parallel, taking the space between the gear assembly (10) and the gear trains (43) (44); and
    wherein a pump shaft (42) extending rearwardly from the pump (19) is mounted with a plurality of gears (48) (50) interconnecting to a follower of the gear trains (43) (44), and a motor shaft (25) extending forwardly from the motor (20) is mounted with a gear (41) interconnecting to the above-mentioned last remaining gear of the gear assembly (10).

2. A transmission system as defined by claim 1, wherein the gear trains (43) (44) are respectively adapted, with aid of the change-over means (45), for driving connection selectively with the input shaft (5).

3. A transmission system as defined by claim 1, wherein the gear trains (43) (44) are respectively adapted, with aid of the change-over means (45), for driving connection selectively with the output shaft (7).

4. A transmission system as defined by claim 1, wherein the hydraulic pump (19) is adapted to be driven by the input shaft (5) in one speed range and by the output shaft (7) in another speed range.

5. A transmission system as defined in claim 1, wherein the change-over means, (45) is of hydraulic clutch type.

6. A transmission system as defined in claim 1, wherein the change-over means (45) is of meshing selective type.

7. A transmission system as defined in claim 1, wherein the change-over means (45) is of constant-mesh type.

* * * * *